United States Patent [19]

Litz et al.

[11] 4,274,082
[45] Jun. 16, 1981

[54] TRANSMISSION SYSTEM FOR THE DIGITAL CONTROL OF DEVICES

[75] Inventors: Heinz Litz; Volker Hallwirth, both of St. Georgen; Karl Storz, Hardt, all of Fed. Rep. of Germany

[73] Assignee: Dual Gebrüder Steidinger, St. Georgen, Fed. Rep. of Germany

[21] Appl. No.: 79,721

[22] Filed: Sep. 28, 1979

[51] Int. Cl.³ .......................... H04Q 5/14; H04Q 7/00
[52] U.S. Cl. ................................ 340/167 R; 340/172; 340/694
[58] Field of Search ..................... 340/172, 694, 167 R

[56] References Cited

U.S. PATENT DOCUMENTS 3,798,600  3/1974  Saikaishi ........................ 340/694 X Primary Examiner—Harold I. Pitts
Attorney, Agent, or Firm—Martin A. Farber

[57] ABSTRACT

Transmission system for digital control of electrical devices, by means of standardized or uniformly releasable pulse combinations corresponding to the desired control operations, which pulse combinations are sent selectively at least from a first and a second of the devices to be controlled to a two-conductor line system, which line system connects all devices in parallel with each other, whereby the connection line is under a constant bias voltage. The bias voltage, depending upon which of the two devices emits signals, is switched or changed over to a low bias voltage, the level of the low bias voltage being selected such that the signals to be transmitted from the first device, which signals are sent, by means of corresponding conversion circuits as voltage intrusions of a certain depth, to the connection line, do not become operative or effective, because the latter signals (the voltage intrustions) are not deeper than the drop to the lower of the two bias voltages, whereby the first device receives the control pulses from a hand-operable control device and the second device receives from a microprocessor which is located in the second device, the signal output of the microprocessor being predetermined to a certain action by adjustment of adjustment means.

2 Claims, 6 Drawing Figures

TRANSMISSION SYSTEM FOR THE DIGITAL CONTROL OF DEVICES

FIELD OF THE INVENTION

The invention relates to a transmission system for the digital control of electrical devices, by means of uniform or unified releaseable pulse combinations corresponding to the desired control operations, which pulse combinations can be sent selectively at least by a first and a second of the devices to be controlled to a line system, the line system connecting in parallel all devices with each other, particularly for remote control of electronic devices used for entertainment.

BACKGROUND OF THE INVENTION

In the field of electronic data processing it is known to use such type of transmitting systems. They require as a rule, in addition to the corresponding information conversion circuits, the so-called interfaces, line connections of various types, such as the so-called data bus, the transfer control- and the interface- control bus. Moreover so-called over-head circuits are required, by means of which circuits the information output from the different positions is coordinated, which taken together requires a considerable circuitry and line expense. Consequently such types of transmission system, for example in the realm of entertainment electronics, are not usable.

The known simpler transmission systems, with which information can not be given out from different devices, that is with which no so-called information exchange is possible, are as a rule constructed such that each of the devices to be controlled is connected itself with the central control unit via a line, and these lines as a rule are four-conductors or four-wired.

Since these lines moreover have to transmit pulses of comparatively high frequency, problems arise with respect to line length and shielding or screening indeed particularly if HF receivers are located in the vicinity or are to be controlled. In electronic devices in the entertainment field, these devices are furthermore all connected with one another LF-wise (low frequency-like) so that to avoid disturbances by formation of electrical loops with the control lines, a correspondingly large number of decoupling or neutralizing circuits is necessary. Even such a transmission system requires a comparatively large line and circuitry expense. Since such a transmission system does not permit information exchange, it is neither possible for example in the realm of entertainment electronics on the one hand to operate the LF (low frequency), amplifier remotely, nor, on the other hand, to switch on the LF (low frequency) amplifier and the tape device by or from the tuner at a predetermined time. Such a system also is not expandable in the manner that for example first only one of the devices is controlled and later other devices can be connected, which devices can be controlled from the same position or even from another position. Moreover the installation of the line which is required for this is somewhat cumbersome, which is particularly disadvantageous when the installation is to be provided in a living space and by a layman, as that is the case with devices in the realm of entertainment electronics.

OBJECT OF THE INVENTION

It is an object of the invention to make a transmission system suited for information exchange, which system reduces the expense for the connection lines required for this and their accompanying circuitry for a sure and disturbance-free information transmission and simplifies the installation, particularly with a subsequent or supplementary expanded or increased use of the transmission system, so that the installation can also be undertaken by laymen.

SUMMARY OF THE INVENTION

This task is aided in its solution by the invention in a transmission means for the digital control of electric devices, by means of uniformly or standardized releasable pulse combinations corresponding to the desired control operations, which pulse combinations can be sent selectively, at least by a first and a second of the devices to be controlled, to a line system, which line system connects all devices in parallel with each other, particularly for the remote control of electronic devices used for entertainment, characterized in the manner that the line system comprises a two-conductor connection line (1), which connection line firstly is connected to an energy supply circuit (12) of constant voltage, by connection with at least one of the devices (2 to 5), secondly is connected to a first conversion circuit (8) by connection with the first device (2), which first conversion circuit receives the control signals of a hand-actuatable control unit (7), and thirdly is connected to a second conversion circuit (15) by connection with the second device (3), which second conversion circuit from a microprocessor (13) at a predeterminable moment (which moment is determinable by adjustment means (16)) can likewise receive pulse combinations via a first circuit and, via a second circuit, can receive an essentially constant signal voltage, which signal voltage corresponds to the total duration of the emitted pulse combination, and the first conversion circuit (8) is so designed or laid out that the first conversion circuit reduces the bias voltage of the connection line (1) for the duration of one pulse by a first amount of its voltage, which amount corresponds to a portion of its value, and the second conversion circuit (15) with the first circuit of the microprocessor (13) forms a first circuit, which latter first circuit for the duration of one pulse reduces the voltage of the connection line (1) by a second amount, which second amount corresponds approximately to double the amount of the first conversion circuit (8) and the second conversion circuit (15) with the second circuit of the microprocessor (13) forms a second circuit, which latter second circuit lowers the bias voltage of the connection line (1) for the entire duration of the pulse output by about the same amount as the first conversion circuit (8) for the duration of a pulse and at least one of the devices (2) to (5) is connectable to the connection line (1) with a third conversion circuit (14), which third conversion circuit decouples or neutralizes the pulse-like voltage reductions of the connection line (1) DC -current-free and in suitable form again retransmits them to the microprocessor (13), the latter controlling the operations or functions of the device.

The arrangement in accordance with the invention makes possible a considerable reduction of the required line and circuitry expense, without essentially limiting the range or extent of the information possibilities. This simplification makes possible also an economical or commercial expansion of the use of the transmission system with the simplest operation. This is achieved essentially by use of a single only two-wired or two-conductor potential-free connection line which is simultaneously an information carrier and an energy carrier, in the manner that the line can be supplied with voltage by each of the devices. By means of different bias voltages the line becomes the carrier of several transmission channels, so that the so-called over-head expense which makes possible the information exchange can be practically dispensed with.

Further in accordance with the invention the constant voltage of the energy supply circuit (12) of the connection line (1) is produced by the voltage drop of a Zener diode (17) in the reverse or high resistance direction and this voltage, by means of the first conversion circuit (8) as well as by means of the second circuit of the second conversion circuit (15), upon arrival of a pulse, or respectively, of the signal voltage, each respectively with the help of the inverse or reverse voltage drop of a Zener diode (24, 25) (these Zener diodes being disposed in parallel to the connection line (1)), is reduced to approximately half, and the connection line (1) by means of a switching transistor (37), which switching transistor is disposed in the first circuit of the second conversion circuit (15) and parallel to the two conductors (34, 35) of the connection line (1), is short-circuited if this first circuit receives a pulse.

This further formation contains a particularly simple solution for the prevailing reduction of the voltage of the connection lines upon the arrival of signals and is suited for the case where the control signals need only be emitted from two devices, which require a certain mutual rendering of priority or favoring.

BRIEF DESCRIPTION OF THE DRAWINGS

With the above and other objects and advantages in view, the present invention will become more clearly understood when considered in connection with accompanying drawings of which

DETAILED DESCRIPTION

Figure 1:
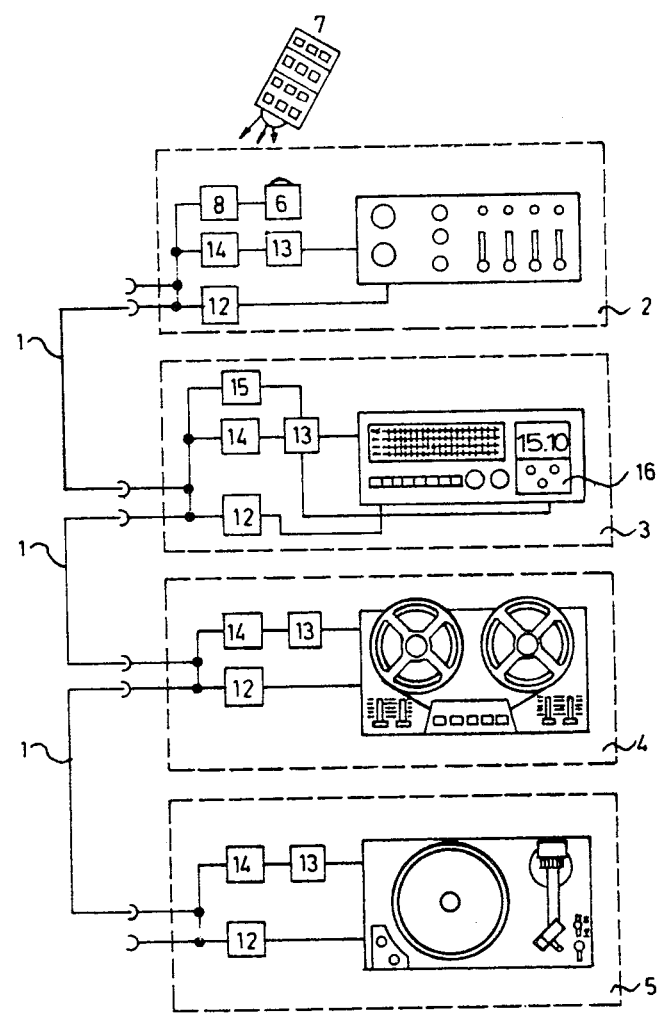
FIG. 1 shows a transmission system as a block circuit diagram.

According to FIG. 1 a LF (low frequency) amplifier 2, a tuner 3, a tape recorder 4 and a turntable 5 are connected in parallel to a common connection line 1. Each of the devices 2 to 5 contains an energy supply circuit 12 which supplies the connection line 1 with constant DC or direct voltage. A manually actuatable control device comprises an infrared transmitter 7, which transmitter sends out combinations corresponding to beam pulses or radiation pulses of corresponding combinations, which pulses or combinations are triggered or released by hand, and which combinations are sent to a receiver 6, the latter being built into the LF amplifier 2. The receiver 6 converts the received beam pulses into electrical pulses, which electrical pulses are transmitted by means of the first conversion circuit 8 as voltage intrusions on to the connection line 1 and consequently are fed to all the devices 2 to 5 to be controlled, which devices capture or receive the pulses that have been converted with the third conversion circuit 14. The third conversion circuit further transmits the pulses free of DC or direct current to the microprocessors 13. The microprocessors then in turn control the desired operations of the devices.

The tuner 3 is provided with a second conversion circuit 15, which second conversion circuit transmits the pulses which are emitted from the tuner's microprocessor 13 in a similar manner as that in which the first conversion circuit 8 transmits to the connection line 1, whereby the moment of the output can be predetermined by corresponding adjustment means 16. These adjustment means 16 can operate on or act on a clock, in order, for example, to be able to receive a radio transmission on tape at a predetermined time, that is to say to be able to control other devices also by means of or from the tuner. The control means can also come into operation with the end of a tape playback in order to turn off devices which are connected with the playback device for example.

The energy supply and the conversion or transformation of the pulses, in order to be able to transmit the pulses in the desired manner, results from the following described circuits.

Figure 3:
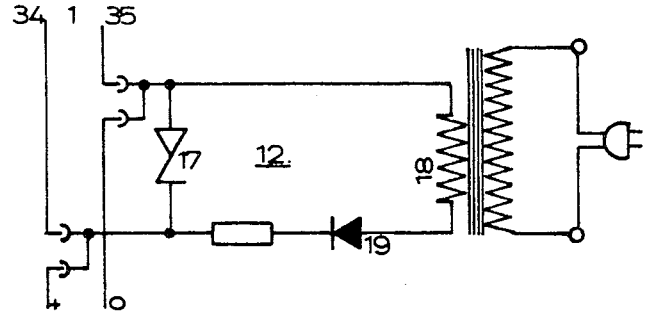
FIG. 3 is an energy supply circuit for the connection line of the devices.

According to the energy supply circuit 12 which is illustrated in FIG. 3 a first Zener diode 17 receives a current from a current source 18 in the device 2 to 5 associated with it, which current as a consequence of a precedingly connected or series-connected diode 19 can flow only in the reverse or high resistance direction of the Zener diode 17. The current produces an inverse, reverse or back voltage drop of 18 volts at the Zener diode 17, which voltage drop is tapped off as bias voltage for the two conductors 34, 35 of the connection line 1. The current source 18 has no galvanic connection to the ground of the device, so that the connection line 1 is free of potential.

Figure 4:
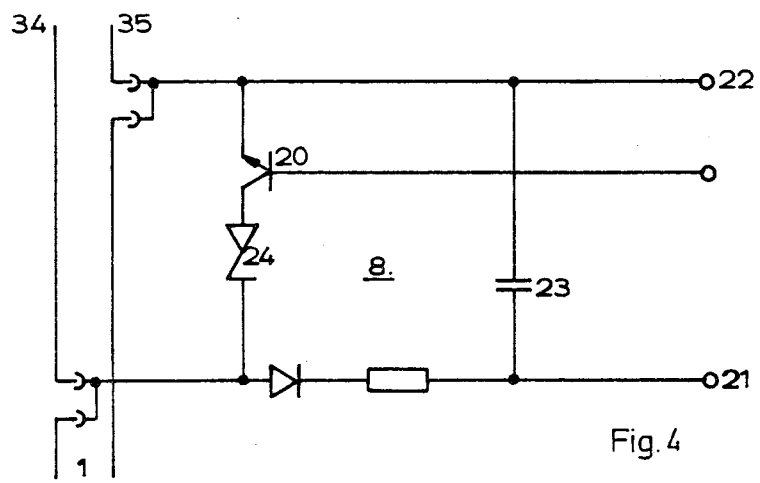
FIG. 4 is a first conversion circuit for converting the received digital pulses for the transmission to other devices.

FIG. 4 shows the transmission of the signals (which signals have been received by the infrared receiver 6 and have been converted to electrical pulses), to connection line 1, by means of the first conversion circuit 8, and respectively, by means of the first circuit means 20, 23, 24. If the base of a first switching transistor 20 receives voltage by the arrival of a pulse, then the transistor 20 switches or connects through, going into conduction and a second Zener diode 24 (which second Zener diode 24 is connected in series with the transistor 20) receives current in reverse direction from a current source in the LF amplifier 2 via two terminals 21, 22, and respectively, from a capacitor 23 which is charged via these terminals 21, 22, which causes a voltage drop of approximately 8 volts. By the parallel circuit wiring of the second Zener diode 24 to the connection line 1, this voltage is impressed or superposed on this diode 24 or on the connection line 1 for the duration of the pulse, as a corresponding voltage intrusion.

Figure 6:
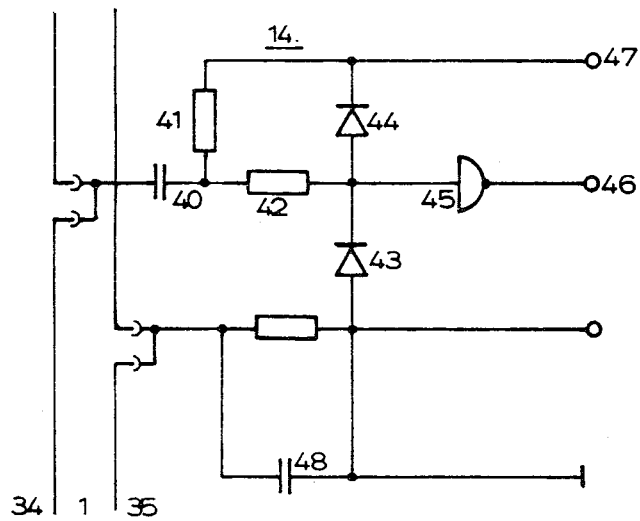
FIG. 6 is a third conversion circuit for converting of the pulses (received by the connection line of the devices), for further processing in the devices to be controlled.

FIG. 6 shows the transmission of these pulses to the respective microprocessors 13 (which microprocessors are located in the devices 2 to 5) by means of the third conversion circuits 14. This transmission takes place free of direct current by means of two capacitors 40 and 48 via two terminals 46, 47, which terminals lead to the respectively associated microprocessor 13 of the device. In this manner the signals are brought via two resistors 41, 42, two diodes 43, 44 and a converter 45 into the form appropriate for the microprocessor 13. One conductor 35 of the connection line 1 is placed via or over one of the two capacitors 48, HF-like low resistive or low ohmed, to the ground of the device.

Figure 5:
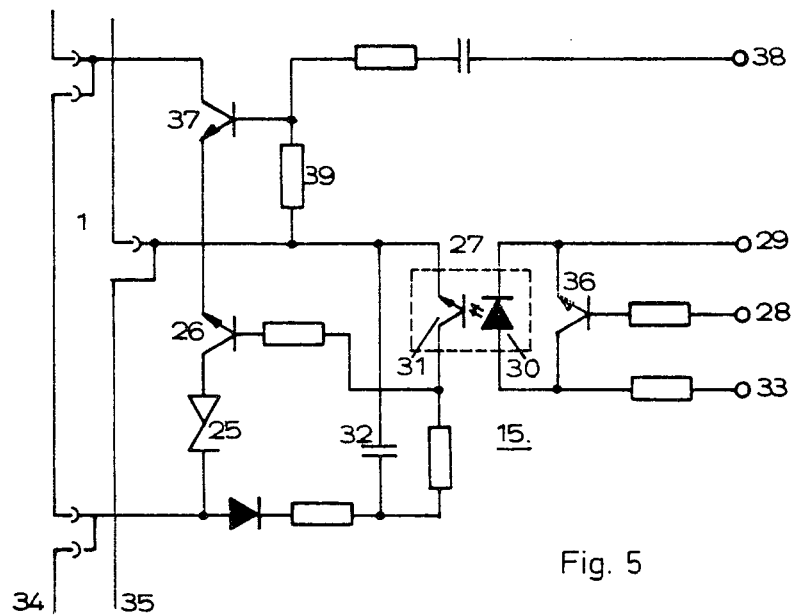
FIG. 5 is a second conversion circuit for the same previously mentioned purpose.

FIG. 5 shows the transmission of the pulses which are emitted from the microprocessor 13 of the tuner 3 to the connection line 1 by means of the second conversion circuit 15.

For the case when at the same time as the pulse output from the microprocessor 13, pulses are also emitted from the infrared transmitter, care is taken that only the pulses which are emitted from the microprocessor 13 can go into action or become effective in the following manner. With the output of the pulses from the microprocessor 13, simultaneously, for the entire duration of the pulse output, the voltage of the connection line 1 is brought by the microprocessor 13 to approximately 8 volts and consequently to the value to which the first conversion circuit 8 brings the connection line 1 if a pulse is present, so that pulses which are possibly sent to the first conversion circuit 8 cannot come into operation.

The general lowering of the voltage of the connection line 1 to eight volts is caused by third circuit means 25, 26 in a second circuit and specifically by means of a third Zener diode 25, which Zener diode 25 by means of a second switching transistor 26 can be connected-through parallel to the connection line 1 and has a corresponding reverse voltage drop, in the manner that the second switching transistor 26 is driven into conduction by means of an optical coupler 27 by a signal voltage of the microprocessor 13 of the tuner 3 via a second terminal 28, 29. This signal voltage switches a switching transistor 36 into conduction, which transistor 36 short-circuits the photodiode 30 of the optical coupler 27, which photodiode 30 is in parallel to the switching transistor 36, such that the phototransistor 31 of the optical coupler 27 (which phototransistor is controlled by the photodiode 30) is inhibited, the optical coupler 27 or phototransistor 31 lying at the base of the switching transistor 26 for the Zener diode 25, whereby a voltage occurs at this base, which voltage switches the transistor 26 into conduction. The photodiode 30 of the optical coupler 27 for this purpose receives its operating current via a terminal 33 from the tuner 3, and the phototransistor 31, from the connection line 1, whereby the voltage is held constant by a capacitor 32.

The point of time of the signal output of the microprocessor 13 of the tuner 3 is predetermined by adjustment of service or control operating elements for the adjustment means 16 (the latter being in connection with the microprocessor 13 of the tuner 3), with the aid or utilization of an electronic time indicator, the latter being controlled by the microprocessor 13.

The transmission of the pulses, which pulses are emitted by the microprocessor 13, to the connection line 1 takes place via a first circuit, whose second circuit means 37, 39 include a third switching transistor 37, which switching transistor 37 lies between the two conductors 34, 35 of the connection line 1 and short-circuits the connection line 1 or the two conductors when the switching transistor 37 is connected through into conduction. This takes place when a pulse is supplied to the base resistor 39 by the microprocessor 13 of the tuner 3 via a first terminal 38.

Since the voltage intrusion on the connection line 1 in this case has the same value as the voltage intrusion produced by the first conversion circuit 8 by a pulse, the alternating or AC voltage component which is decoupled or neutralized by means of the capacitor 40 of the conversion circuit 14 in both cases is the same, which is required for a uniform reutilization.

Figure 2:
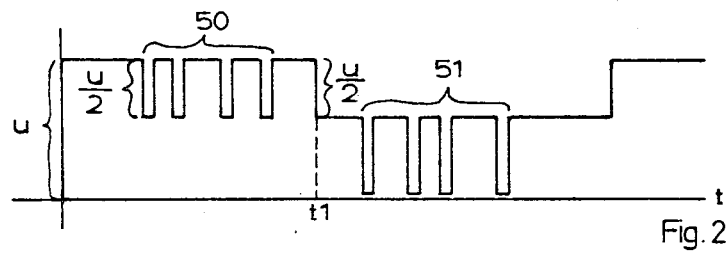
FIG. 2 shows the voltage course of the connection line of the devices.

FIG. 2 illustrates the voltage course of the connection line 1, whereby U represents the value of the voltage in the rest or neutral condition. Intrusions or break-ins in this voltage occur according to the electrical pulses produced by the infrared receiver 6. $t_1$ designates approximately the fixed point in time, determinable by the adjustment means 16, at which point pulses are to be emitted from or by the microprocessor 13 of the tuner 3. Shortly before this output the voltage of the transmission line 1 is reduced to half, which corresponds to the depth of the pre-mentioned voltage breaks or intrusions 50. The output of the pulses from the microprocessor 13 then leads to corresponding short circuits of the connection line 1 and consequently to equally large voltage intrusions or breaks 51. If three devices were to be able to emit control pulses, in a certain or given order of precedence, it is readily evident that for this, the voltage of the connection line 1 would have to be reduced in two steps or stages instead of one.

From the described embodiment example it further results that a subsequent or supplementary expansion of the use of this transmission system is possible in an economical and simple manner. Thus, for example, to begin with, only a single device, such as a turntable or tape recorder device can be remotely controlled without connection with other devices. Later, additional devices can also be remotely controlled concurrently by simple connection of the existing device by means of the two-conductor connection line. If at first only one turntable is to be remote-controlled, this requires, in addition to the circuits 12, 13, 14 which are present in the device 5, only the further purchase of an infrared receiver 6 with a first conversion circuit 8, which can be connected as a separate unit to the turntable, or respectively, to its terminal for the transmission line 1.

Such a terminal can also be applied or attached to an amplifier 2 according to FIG. 2, which amplifier per se contains such a unit, that is to say if the amplifier does not stand in the sighting or viewing direction of the operator. In the separate unit which contains the receiver 6 can be placed in the sighting or viewing direction.

While I have disclosed embodiments of the invention it is to be understood that these embodiments are given by example only and not in a limiting sense.

The reference numerals in the claims are provided only for ready association for illustration purposes with corresponding elements in the preferred embodiment and not in a limiting sense.

I claim:

1. Transmission system for the digital control of electrical devices, by means of uniform releaseable pulse combinations corresponding to the desired control operations, which pulse combinations selectively can be sent from at least a first and a second of the devices to be controlled to a line system, the line system connecting all devices in parallel, particularly for the remote control of electronic devices used in the entertainment field comprising a two-conductor connection line (1) to which all devices to be controlled are connectable in parallel, an energy supply circuit means (12) disposed in a first one of the devices to be controlled, said circuit means (12) for making available a constant voltage, said constant voltage, upon connection of the device to the connection line (1), being provided as bias voltage to the connection line (1), a hand-operable control means (6, 7) for the production of the previously mentioned pulse combinations and for making these pulses available as electrical pulses, a first conversion circuit means (8) in said first device (2), connectable to said connection line (1) with the connection of said first device (2) with the connection line (1) and containing a first circuit means (24, 20, 23), said first circuit means (24, 20, 23) for reducing the bias voltage of the connection line (1) for the duration of a pulse which is received by said hand-operable control means (6, 7) by a first amount, which amount corresponds to a part of its value, and a microprocessor means (13) arranged in the second device (3) equipped for transmission of pulse combinations to a first terminal (38) for control of the devices to be controlled and equipped for transmission of a signal voltage to a second terminal (28, 29), said signal voltage being essentially constant for the duration of the transmission of said previously mentioned pulse combinations, adjustment means (16) for the predeterminable adjustment of the point in time when said microprocessor means (13) of the second device (3) transmits said previously mentioned pulse combinations for the control of the devices and for said signal voltage, a second conversion circuit means (15) arranged in said second device (3), and containing a first circuit and a second circuit, both said first circuit and said second circuit on the one hand with the connection of the second device (3) with said connection line (1) being connectable to the connection line (1) and on the other hand with said first circuit being connected to said first terminal (38) and said second circuit to said second terminal (28, 29) of said microprocessor means (13) of said second device (3), second circuit means (37, 39) arranged in said first circuit for reducing the bias voltage of the connection line (1) for the duration of a pulse by an amount which corresponds approximately to double the amount of the first conversion circuit (8), third circuit means (25, 26) arranged in the second circuit for lowering the bias voltage of the connection line (1) for the duration of the signal voltage by about the same amount as the first circuit means of the first conversion circuit means (8), another microprocessor means (13) arranged in another device to be controlled for controlling desired device functions after receiving corresponding pulse combinations, a third conversion circuit means (14) arranged in the another device to be controlled and with the connection of the latter device with said connection line (1) on the one hand said third conversion circuit means (14) is connectable to said connection line (1), and on the other hand is connected with said another microprocessor means (13) inside the latter device to be controlled and contains electrical switching means (40 to 48), said electrical switching means for coupling out free of direct current the pulse-like voltage reductions of the connection line (1) and for retransmitting to the said another microprocessor means (13) for triggering of corresponding functions.

2. Transmission system according to claim 1, further comprising a direct current source (18) arranged in one of the devices to be controlled and having a circuit, a first Zener diode (17) disposed between the two conductors (34, 35) of the connection line (1) and in the circuit of said direct current source, said first Zener diode being flowed through in the reverse direction by the current, resulting in the bias voltage of the connection line (1), a second Zener diode (24), a first switching transistor (20) having a working path, said second Zener diode (24) and said first switching transistor (20) with said working path, are connected in series between the two conductors (34, 35) of the connection line (1) and a circuit of the first conversion circuit means (8) and are arranged with the base of said first switching transistor operatively connected to said hand-operable control means (6, 7) such that upon arrival of a pulse from said hand-operable control means (6, 7) on said base of said first switching transistor (20) current flows through said second Zener diode (24) in the reverse direction, the reverse voltage drop of the second Zener diode being chosen such that the reverse voltage drop of said second Zener diode reduces the bias voltage of the connection line (1) approximately to half, a third Zener diode (25), a second switching transistor (26) having a working path, said third Zener diode (25) and said second switching transistor (26) with its said working path are connected in series between the two conductors (34, 35) of the connection line (1) and in the second circuit of the second conversion circuit means (15) and are arranged such that upon the signal voltage from the first-mentioned microprocessor means (13) of the second device arriving at the second circuit of the second conversion circuit means (15) current flows through said third Zener diode (25) in the reverse direction, and the reverse voltage drop of said third Zener diode is selected such that said reverse voltage drop of said third Zener diode reduces the bias voltage of the connection line (1) likewise to approximately half, a third switching transistor (37) having a base operatively connected to said first-mentioned microprocessor means (13) of the second device (3) and having a working path disposed between the two conductors (34, 35) of the connection line (1) and in said first circuit of said second conversion circuit means (15) and arranged such that said third switching transistor connects-through into conduction when a pulse emitted from said first-mentioned microprocessor means (13) of the second device (3) arrives at said base of said third switching transistor.

* * * * *